Figure 1:
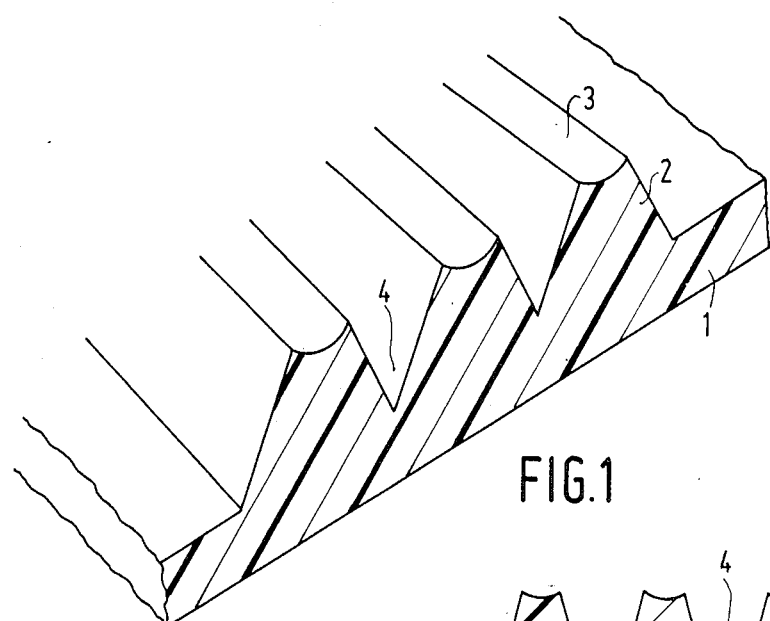

United States Patent [19]

van der Hoorn et al.

[11] Patent Number: 4,660,930
[45] Date of Patent: Apr. 28, 1987

[54] TRANSMISSION PROJECTION SCREEN AND METHOD OF MANUFACTURING SAME

[75] Inventors: Gustaaf H. A. van der Hoorn; Caspert G. I. van der Staak; Joseph J. M. Lamberts; Johannes H. A. Schmitz, all of Eindhoven, Netherlands

[73] Assignee: U. S. Philips Corporation, New York, N.Y.

[21] Appl. No.: 844,052

[22] Filed: Mar. 26, 1986

[30] Foreign Application Priority Data

Jan. 10, 1986 [NL] Netherlands ........................ 8600042

[51] Int. Cl.$^4$ .............................................. G03B 21/60
[52] U.S. Cl. ..................................... 350/126; 350/128
[58] Field of Search ................................ 350/126, 128

[56] References Cited

U.S. PATENT DOCUMENTS 4,525,029  6/1985  Inoue et al. ........................ 350/128
4,573,764  3/1986  Bradley ........................... 350/126 X

FOREIGN PATENT DOCUMENTS 154053   9/1985  European Pat. Off. ............ 350/126
182430  10/1984  Japan ................................. 350/126
75826   4/1985  Japan ................................. 350/126
79343   5/1985  Japan ................................. 350/126

*Primary Examiner*—Richard A. Wintercorn
*Attorney, Agent, or Firm*—Thomas A. Briody; William J. Streeter; Marianne R. Rich

[57] ABSTRACT

The projection screen has a transparent substrate having a front surface which is provided with mutually parallel ribs. Light-absorbing particles 7 whose size is 20 to 75% of the width of the grooves measured halfway the depth of these grooves, are disposed at the bottom of the grooves 4 between the ribs 2. The particles are fixed by means of a glue layer 6.

5 Claims, 5 Drawing Figures

TRANSMISSION PROJECTION SCREEN AND METHOD OF MANUFACTURING SAME

The invention relates to a transmission projection screen comprising a transparent substrate having a front surface which is provided with mutually parallel ribs from which light issues during operation of the screen, grooves being present between the successive ribs, in which grooves an amount of light-absorbing particles is disposed.

The invention also relates to a method of manufacturing a transmission projection screen.

Such a screen is used, for example, for displaying images or alphanumeric data which are projected on the rear surface of the screen, for example, by a lens system with one or more cathode-ray tubes or by a film projector. The transparent ribs located at the front surface focus the light rays which are received from the rear side and which issue via the apexes of the ribs. In order to avoid reflection of ambient light from both the front side and the rear side of the screen, which would reduce the contrast of the image to be displayed, a light-absorbing material is disposed in the grooves. It is known to those skilled in the art that for this purpose a black lacquer layer is applied or that black wires are disposed in the grooves. A disadvantage of these screens is that they may be subject to warpage due to mechanical forces acting on one side of the screen, for example under the influence of moisture.

From European Patent Application EP No. 143053 a transmission projection screen and a method of manufacturing such a screen are known, in which method discrete black particles are deposited and fixed in the grooves. The black particles are small relative to the dimensions of the grooves so as to enable them to be deposited easily and homogeneously.

The black particles consist of, for example, soot or a ferritic material having a synthetic resin skin. By temporarily subjecting the particles to heat or a solvent vapour, a cohesive synthetic resin skin is formed over the particles, which skin retains the particles in the grooves.

A disadvantage of the screen thus manufactured is that there are many contact points between the walls of the ribs and the light-absorbing material, consequently, light which should be totally reflected at the inside of the walls in order to be transmitted to the front side is absorbed instead, thus causing the light output of the screen to be decreased.

It is an object of the invention to provide a transmission projection screen, such that a very slight optical contact between the light-absorbing material and the substrate with the ribs is obtained in order to leave the light output substantially unaffected while improving the contrast.

This object is achieved in accordance with the invention by a transmission projection screen as described in the opening paragraph, which screen is further characterized in that the average particle size is 20 to 75% of the width of the grooves measured halfway the depth of these grooves.

In a preferred embodiment of the projection screen in accordance with the invention, the average size of the particles is 50 to 70% of the width of the grooves measured halfway the depth of these grooves.

Due to the relatively large dimension of the particles, few particles are needed to obtain the desired light absorption. Because of the small number of particles there are only few contact areas between the particles and the walls of the ribs. The maximum particle size is dictated by the wish that the particles are situated entirely in the bottom half of the grooves in order not to absorb the light issuing from the apexes of the ribs. Limiting the size of the particles is also desired in order to homogeneously fill the grooves in a longitudinal direction so as to obtain a screen having a smooth appearance.

A further object of the invention is to provide a method of manufacturing a transmission projection screen, in which also relatively large light-absorbing particles can readily be deposited in the grooves. An additional object of the invention is to provide a method by means of which any type of light-absorbing particles can be deposited, even if they are not provided with a synthetic-resin layer.

This object is achieved in accordance with the invention by a method which comprises the following steps:

a substrate having mutually parallel ribs is coated with a layer of adhesive which has a low solids content, the excess adhesive is removed by an absorbing material so that only the bottom of the grooves remains coated with adhesive, the adhesive is dried so that a thin sticky layer is formed on the bottom part of the walls of the grooves, an excess of light-absorbing particles is provided onto the screen, a brush is moved over the screen in the longitudinal direction of the grooves, so that the light-absorbing particles are pressed to the bottom of the grooves and the excess particles are removed from the screen.

In order to obtain that after drying the adhesive layer does not fill the grooves and does not adversely affect the shape of the ribs, the solids content of the glue layer to be applied is, preferably, between 0.5 and 20% by weight. Thus, the internal reflection of the light in the ribs remains optimal.

The adhesive layer is so provided that the light-absorbing particles are fixed only in the bottom part of the grooves, the remaining particles are brushed away. Moreover, by using large particles it is precluded that light-absorbing particles remain on the apexes of the ribs, for example, at the location of a possible lens structure.

The choice of the adhesive is dictated by the materials used for both the substrate with the ribs, and the light-absorbing particles. The glue to be used must meet the requirements that it must remain sticky after drying and it must form a smooth surface.

An alternative embodiment of the method in accordance with the invention comprises the following steps:

an excess of light-absorbing particles is provided onto a substrate having mutually parallel ribs, a brush is moved over the screen in the longitudinal direction of the grooves so that the light-absorbing particles are pressed to the bottom of the grooves, and the excess particles are removed from the screen, the screen is coated with an amount of adhesive which suffices to fill the grooves and which has a low solids content, the adhesive is dried so that a bond is formed between the light-absorbing particles and the walls of the grooves.

An advantage of this alternative method is that after drying the adhesive layer does not have to be sticky, consequently, the screen obtained is hardly sensitive to contamination, for example, by dust.

A requirement which must be met by the light-absorbing particles is that they do not resolve into smaller particles when they are subjected to common mechanical treatments, such as brushing, because this would nullify the desired effect of the invention. Suitable light-absorbing materials are, for example, soot, ferrite particles, black synthetic-resin particles, black glass beads and short pieces of black glass fibre. The particles may have any shape, provided that the number of contact areas between the particles and the walls of the grooves does not increase. Preferably, particles are used having curved surfaces, for example convex particles, because in general they establish only point-like contacts with the substrate and the ribs. The particles may consist of smaller particles provided that they are strongly bonded, for example by sintering.

Figure 2A:
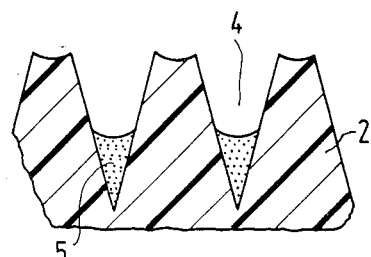
Figure 3:
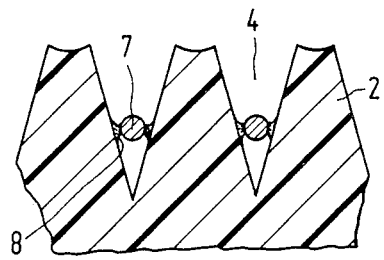
Figure 2B:
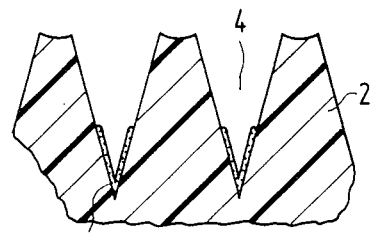
Figure 2C:
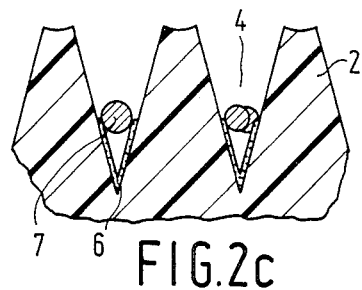

The invention will now be further explained by means of examples of embodiments and with reference to a drawing, in which FIG. 1 is a perspective sectional view of a substrate having mutually parallel ribs, in which FIG. 2a–c schematically represents a number of steps of the method in accordance with the invention, and in which FIG. 3 is a sectional view of the result of an alternative embodiment of the method in accordance with the invention.

EXEMPLARY EMBODIMENT 1.

FIG. 1 shows a substrate 1, for example of polymethylmethacrylate, provided with ribs 2. The screen shown in the Figure is flat, but the invention may also be applied to a slightly curved screen. The ribs 2 are provided at the front surface with a lens structure 3. However, dependent upon the desired optical characteristics of the screen the apexes of the ribs may have various shapes. Between the ribs 2 there are mainly V-shaped grooves 4. The grooves may also have, for example, a flat bottom. The ribs and the grooves may be formed on the surface of the substrate by means of, for example, a replica technique which is known per se, for example, by means of a curable synthetic resin composition, for example, one that can be cured by UV light. In accordance with an alternative method, the ribs and grooves can also be formed in a substrate by means of hot pressing. The rear surface of the substrate (not shown in the Figure) may also be provided with an optical element, for example, a fresnel structure.

In accordance with the present exemplary embodiment, the pitch between the mutually parallel grooves is 550 μm, i.e. the distance measured between the deepest points of two successive grooves, the depth of the grooves 4 is 900 μm.

An amount of acrylate-resin adhesive is poured on and spread over the front surface of the screen. The adhesive is a 10% emulsion in water of Terokal 3199 ® which is marketed by Teroson GmbH in Heidelberg (DE). The excess adhesive is wiped off by means of an absorbing, non-fluff cloth, for example of non-woven cellulose. FIG. 2a is a sectional view of the ribs 2, an amount of adhesive 5 being present at the bottom of the grooves 4.

Subsequently, the adhesive is dried by heating it to 50° C. for 15 minutes. FIG. 2b shows the adhesive layer 6 thus formed, which layer has a thickness of only a few μm.

Subsequently, an excess of black ferrite particles having dimensions from 100 to 125 μm is disposed along one of the edges of the screen. The black particles are longitudinally brushed into the grooves by means of a nylon brush.

FIG. 2c shows the particles 7 which stick to the adhesive layer 6 at the bottom of the grooves 4, the remaining particles are pressed into the grooves elsewhere or wiped off the screen.

The bristles of the nylon brush used all have the same dimensions which are selected so that the bristles can press the black particles deep into the grooves. Because of the desired reproducibility of the method, preferably, a rotating brush is used whose pressure on the screen can be accurately adjusted, and along which the screen is moved by mechanical means.

EXEMPLARY EMBODIMENT 2.

In accordance with the present exemplary embodiment, a screen is used as described in the previous embodiment, in which the distance between the grooves is 275 μm and the depth of the grooves is 440 μm. The adhesive used is a solvent which comprises acrylate-resin glue. The light-absorbing particles consist of soot and their dimensions are from 50 to 80 μm. The method used is the same as described in exemplary embodiment 1.

EXEMPLARY EMBODIMENT 3.

In accordance with the present exemplary embodiment a screen is used as described in example 2, in which the distance between the grooves is 275 μm and the depth of the grooves is 440 μm. By means of a brush as described in exemplary embodiment 1, light-absorbing particles consisting of soot and having dimensions from 50 to 80 μm are disposed in the grooves. Subsequently, a 2.5% by weight solution of polymethylmethacrylate in ethylacetate/isopropanol (volume ratio of the mixture 1:1) is applied to the surface. The grooves are filled by capillary action. If necessary, the excess adhesive is removed by means of an absorbing, non-fluff cloth.

FIG. 3 is a sectional view of the result obtained after evaporation of the solvent (for example at 50° C. for 15 minutes). The polymethylmethacrylate adhesive layer 8 is situated almost exclusively at the location of the glued particles 7. The adhesive layer 8 does not stick after the adhesive has dried.

The projection screens manufactured in accordance with the above-described exemplary embodiments have a high light output and a satisfactory contrast, and they are sufficiently resistant to the action of mechanical influences, moisture and cleaning agents.

What is claimed is:

1. A transmission projection screen comprising a transparent substrate having a front surface which is provided with mutually parallel ribs from which light issues during operation of the screen, grooves being present between the successive ribs, in which grooves an amount of light-absorbing particles is disposed, characterized in that the average particle size is 20 to 75% of the width of the grooves measured halfway the depth of these grooves.

2. A transmission projection screen as claimed in claim 1, characterized in that the average size of the particles is 50 to 70% of the width of the grooves measured halfway the depth of these grooves.

3. A method of manufacturing a transmission projection screen as claimed in claim 1 or 2, characterized in that the method comprises the following steps:

a substrate having mutually parallel ribs is coated with a layer of adhesive which has a low solids content, the excess adhesive is removed by an absorbing material so that only the bottom of the grooves remains coated with adhesive, the adhesive is dried so that a thin sticky layer is formed on the bottom part of the walls of the grooves, an excess of light-absorbing particles is provided onto the screen, a brush is moved over the screen in the longitudinal direction of the grooves, so that the light-absorbing particles are pressed to the bottom of the grooves and the excess particles are removed from the screen.

4. A method as claimed in claim 3, characterized in that the solids content of the glue layer to be provided is from 0.5 to 20% by weight.

5. A method of manufacturing a transmission projection screen as claimed in claim 1 or 2, characterized in that the method comprises the following steps:

an excess of light-absorbing particles is provided onto a substrate having mutually parallel ribs, a brush is moved over the screen in the longitudinal direction of the grooves, so that the light-absorbing particles are pressed to the bottom of the grooves, and the excess particles are removed from the screen, the screen is coated with an amount of adhesive which suffices to fill the grooves and which has a low solids content, the adhesive is dried so that a bond is formed between the light-absorbing particles and the walls of the grooves.

* * * * *